Nov. 15, 1966    R. L. HENRY    3,285,547

MOTOR MOUNTING DEVICE

Filed Dec. 23, 1964

INVENTOR.
ROBERT L. HENRY
BY Albert L. Jeffers.
ATTORNEY

United States Patent Office 3,285,547
Patented Nov. 15, 1966

3,285,547
MOTOR MOUNTING DEVICE
Robert L. Henry, 928 Straford Road, New Haven, Ind.
Filed Dec. 23, 1964, Ser. No. 420,555
3 Claims. (Cl. 248—26)

This invention relates to a new and improved motor mounting device and more particularly, to a mounting bracket for electric motors and the like, in which the ends of the motor are suspended resiliently in a manner reducing the deleterious effects of vibration, noise and other objectionable effects which result from a rigid type mounting.

One of the principal objects of the present invention is to provide a new and improved mounting ring for a mounting bracket which has substantial strength and an adequate service life and which will provide a cushion support for the ends of a motor, such as an electric motor, or the like.

It is an important object of the present invention to provide an economical combination of rigid and resilient members which are joined together to provide a mounting ring in a resilient mounting bracket for an electric motor or the like.

A still further object of the present invention is to provide a novel mounting ring in which one of the members is comprised of a light-weight, strong and rigid plastic member and a circumferential strengthening rib which is combined with a resilient ring at the inner periphery of the rigid ring to provide the support surfaces for a motor or the like.

Figure 1:
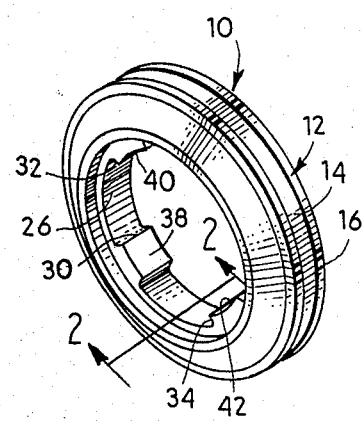
Figure 2:
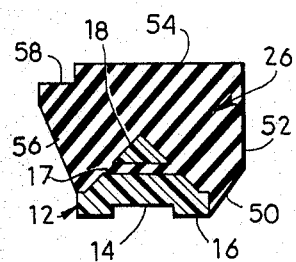
Figure 3:
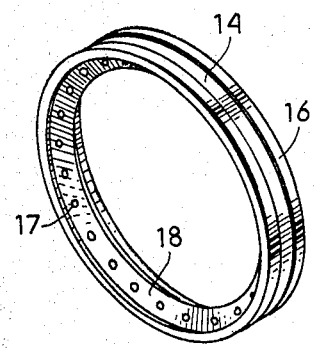
Figure 5:
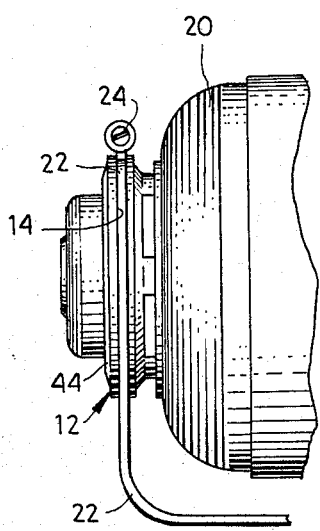
Figure 4:
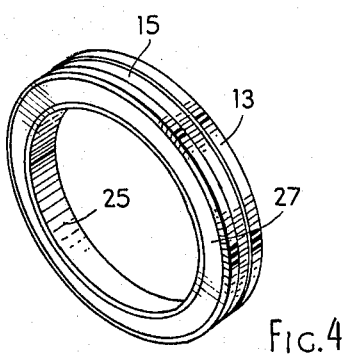

Other objects and features of the present invention will become apparent in consideration of the following description which proceeds with reference to the accompanying drawings, wherein:

FIGURE 1 is a perspective view of the mounting ring;
FIGURE 2 is a section view taken on line 2—2 of FIGURE 1;
FIGURE 3 is a perspective detail view of the plastic annular member which is a component of the mounting ring;
FIGURE 4 is a perspective view of a modification of the mounting ring shown in FIGURE 1; and,
FIGURE 5 is a side elevation view of the mounting bracket and motor is assembled condition.

Referring now to the drawings, the mounting ring designated generally by reference numeral 10 is comprised of a substantially rigid plastic member 12 which is comprised of a suitable heat-hardenable resin such as nylon, teflon, polyethylene, or any other suitable plastic. The rigid plastic ring includes a recess 14 at its outer periphery 16 and an inwardly projecting strengthening rib 18 having a number of openings or holes 17 at the inner periphery of the ring. The construction of the plastic ring is such that it is both rigid and highly resistant to distortion during use, maintaining its shape and position to resist the various lateral, torsional, radial and other forces which arise from mounting an electric motor 20 or the like in the manner shown in FIGURE 5. Within the recess 14 is received a clamp 22 having a screw adjustment 24 which tightens or expands the grip connection around the plastic annular ring 12.

Interlocked with the inner periphery of the rigid plastic ring 12 is a resilient elastomeric ring 26 which is mechanically interlocked with the rib 18 through the openings 17 of the ring 12 and the two rings are secured together to prevent relative circumferential movement therebetween. During the molding of the ring 26 the material will flow through the openings 17 thus providing a strong mechanical interlock. Due to the V-shape of the rib 18 additional surface area is provided for engagement with the elastomeric ring 26. For some applications it may be desirable to omit the openings 17 and provide a chemical bond between the rib 18 and ring 26. This can be accomplished by using a suitable bonding agent or cement.

The resilient ring 26 has a number of spaced radially inwardly extending projections 30, 32, 34 which are visible in FIGURE 1, and a further projection, which is not visible in FIGURE 1, these projections being regularly spaced and providing gripping surfaces 38, 40, 42 which engage the part 44 of the motor 20, so that when the screw 24 is tightened and the ring 12 compressed over resilient ring 26, the surfaces 38, 40, 42 grip against the portion 44 and prevent relative rotation under the torsional forces of the motor 20.

The mounting ring 10 thus provides both vertical support and also resists turning, and lateral movement of the motor 20 within the resilient mounting support. By reason of the resilience of the ring 26, the motor is cushioned against shock and the noise level as well as the vibration level of the motor is minimized.

The mounting ring 10 as described, is a combination of a rigid plastic ring 12 and a resilient ring 26 which are secured together. The mounting ring 10 serves to cushion the various operating and inertial forces which inevitably occur during motor operation. It is intended by means of the resilient ring 26 to preserve the motor against damage as well as minimizing the noise level during operation.

In the present invention, there is eliminated conventional metallic or inorganic components, which fail to provide the novel combination of physical and functional benefits of the present invention, which instead use a plastic, relatively rigid outer ring and a resilient deformable inner ring bonded to the first ring, the both serving together as the resilient mounting structure for the motor.

Referring to FIGURE 2, the resilient ring 26 is asymmetrical through its cross section in contrast with the rigid or relatively rigid plastic outer ring 12. The resilient ring 26 at the right-hand side (FIGURE 2) is inclined at the bottom end 50 and terminates in the straight side 52, which is flat and joins with a curved inner surface 54 which is joined to an inclined face 56 through a stepped ridge or shoulder 58. The purpose of the described configuration is to bond the resilient ring 26 more securely with the plastic ring 12 and resist lateral or sidewise distortions and separations between the two rings; and, the cross section also serves to strengthen the resilient ring against radial distortions.

Integral with the inner surface 54 are the spaced projections 30, 32, 34 previously described.

Referring to FIGURE 4, a rigid metal ring 25 may be substituted for the gripping surfaces 38, 40 and 42. The plastic ring 13 having a recess 15 is mounted with respect to the elastomer member in substantially the same manner as that illustrated in FIGURES 1 and 2 with the exception that the rib 18 is eliminated and the inner periphery is substantially flat. If desired, a bonding cement or agent can be disposed between the plastic ring 13 and the elastomer member 27 for securing the two parts together.

Although the present invention has been illustrated and described with certain selected example embodiments, it will be understood that these are illustrative and in no sense restrictive thereof. It is reasonably to be expected that those skilled in this art can make numerous revisions and adaptations of the invention to meet individual design requirements and it is intended that such revisions and adaptations as incorporate the herein disclosed principles will be included within the scope of the following claims as equivalents of the invention.

I claim:
1. A mounting bracket for motors and the like comprising a relatively rigid ring having a recess in its outer periphery and an annular and inwardly projecting rib on its inner periphery forming a strengthening means to provide rigidity for said ring, said annular rib having openings therein; and a molded rubber ring bonded to the inner periphery of said rigid ring to said rib and said rib openings, said rubber ring including spaced projections extending radially inwardly to form grip connections resisting circumferential movement of the mounted member engaged thereby.

2. A mounting bracket comprising an annular rigid member of heat-hardenable plastic composition, said member including an annular recess in its outer periphery, gripping means received within said recess and adapted to compress the plastic annular member, and elastomeric ring means supported on the inner periphery of said plastic annular member and including spaced gripping surfaces defined by circumferentially spaced inwardly projecting surfaces, said plastic annular member including a rib on its inner periphery which is mechanically interlocked with said elastomeric ring.

3. A mounting bracket for motors and the like comprising, in combination, a plastic ring having a uniform recess around its outer periphery, said ring having an inwardly projecting rib on its inner periphery for forming strengthening means to provide rigidity for said ring, said rib having a number of spaced openings, and an elastomeric ring supported on said rib of said plastic ring and including portions passing through said openings in said rib to mechanically interlock said plastic ring thereto.

References Cited by the Examiner

UNITED STATES PATENTS

| | | | |
|---|---|---|---|
| 1,339,599 | 5/1920 | Garren | 277—231 |
| 2,047,838 | 7/1936 | Smith et al. | 248—22 X |
| 2,074,136 | 3/1937 | Welch | 248—26 |
| 2,307,874 | 1/1943 | Bilde | 10—42 |
| 2,622,949 | 12/1952 | Cotchett | 308—238 |
| 2,904,289 | 9/1959 | Refice | 248—26 |
| 2,936,141 | 5/1960 | Rapata | 248—26 |

FOREIGN PATENTS 1,056,617  10/1953  France.

CLAUDE A. LE ROY, *Primary Examiner.*

R. P. SEITTER, *Assistant Examiner.*